United States Patent [19]
Billard et al.

[11] Patent Number: 5,983,323
[45] Date of Patent: *Nov. 9, 1999

[54] PROCESSOR NODE

[75] Inventors: Christian Billard, Paris; René Chevaux, Boissy; Jean-Louis Joly, Villepreux; Christian Pouliquen, Beynes, all of France

[73] Assignee: Bull, S.A., Puteaux, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,857

[22] Filed: Dec. 8, 1995

Related U.S. Application Data

[63] Continuation of application No. 08/275,384, Jul. 15, 1994, abandoned.

[30] Foreign Application Priority Data

Jul. 15, 1993 [FR] France ................................. 93 08712

[51] Int. Cl.⁶ .................................................. G06F 12/00
[52] U.S. Cl. ......................... 711/130; 711/119; 711/121; 709/200; 712/1
[58] Field of Search ................................. 395/800, 444, 395/446, 448, 457, 458, 200.08, 200.01, 800.01, 200.03; 711/119, 121, 130, 147, 148; 709/200; 712/1

[56] References Cited

U.S. PATENT DOCUMENTS

| | | | |
|---|---|---|---|
| 4,445,174 | 4/1984 | Fletcher | 364/200 |
| 4,644,496 | 2/1987 | Andrews | 712/13 |
| 4,755,930 | 7/1988 | WIlson, Jr. et al. | 364/DIG. 1 |
| 5,055,999 | 10/1991 | Frank et al. | 364/200 |
| 5,067,071 | 11/1991 | Schanin et al. | 395/293 |
| 5,136,500 | 8/1992 | Lemay et al. | 395/250 |
| 5,140,681 | 8/1992 | Uchiyama et al. | 395/425 |
| 5,165,018 | 11/1992 | Simor | 395/300 |
| 5,226,144 | 7/1993 | Moriwaki et al. | 395/425 |
| 5,228,136 | 7/1993 | Shimizu et al. | 395/425 |
| 5,241,641 | 8/1993 | Iwasa et al. | 395/425 |
| 5,241,664 | 8/1993 | Ohba et al. | 395/425 |
| 5,247,613 | 9/1993 | Bromley | 395/200.18 |
| 5,261,109 | 11/1993 | Cadambi et al. | 395/725 |
| 5,291,442 | 3/1994 | Emma et al. | 395/425 |

(List continued on next page.)

FOREIGN PATENT DOCUMENTS

| | | |
|---|---|---|
| 0388032 | 2/1990 | European Pat. Off. . |
| 0434250 | 11/1990 | European Pat. Off. . |
| 0439693 | 4/1991 | European Pat. Off. . |
| 1144154 | 5/1983 | Japan . |
| 59-218532 | 12/1984 | Japan . |

OTHER PUBLICATIONS

IBM Techical Disclosure Bulletin, vol. 30, No. 10, Mar. 1988, New York, US, p: 444–46, "Shared and Private Cache".

Eurocon 84 Computers In Communication And Control Sep. 26, 1984, Brighton, GB—pp. 333–337—M. Wyrzykowski "A Homogenous Modular Operating System for Multimicrocomputer—Real–Time Control Applications".

10th International Conference on Distributed Computing Systems, May 28, 1990, Paris, France—pp. 270–277, K. Padmanabhan, "Hierarchical Communication in Cube–Connected Multiprocessors".

Patent Abstracts of Japan, vol. 14, No. 153 (P–1026) Mar. 23, 1990 & JP–A–02 012 361 (Fujitsu Ltd) Jan. 17, 1990.

*Primary Examiner*—Meng-Ai T. An
*Assistant Examiner*—Walter D. Davis Jr.
*Attorney, Agent, or Firm*—Kerkam, Stowell, Kondracki & Clarke, P.C.; Edward J. Kondracki

[57] ABSTRACT

A processor node which includes at least one local bus (10) that assures a parallel link among the processors (8), a local memory (11) and a shared cache (12), and one network bus (13) that assures a parallel link among the local memory (11), the shared cache (12), and at least one input/output device (6).

25 Claims, 5 Drawing Sheets

U.S. PATENT DOCUMENTS

| | | | |
|---|---|---|---|
| 5,303,362 | 4/1994 | Butts, Jr. et al. | 395/425 |
| 5,390,336 | 2/1995 | Hillis | 395/800 |
| 5,394,555 | 2/1995 | Hunter et al. | 395/800 |
| 5,437,045 | 7/1995 | Davies | 712/16 |
| 5,471,592 | 11/1995 | Gove et al. | 709/213 |
| 5,483,640 | 1/1996 | Isfeld et al. | 395/200.03 |
| 5,490,253 | 2/1996 | Laha et al. | 395/304 |
| 5,511,224 | 4/1996 | Tran et al. | 395/800 |
| 5,561,809 | 10/1996 | Elko et al. | 395/800 |
| 5,629,950 | 5/1997 | Godiwala et al. | 371/51.1 |

PROCESSOR NODE

This is a Continuation, of application Ser. No. 08/275,384, filed Jul. 15, 1994 abandoned.

CROSS-REFERENCES TO RELATED APPLICATIONS

This application is related to U.S. application Ser. No. 08/275,377, now U.S. Pat. No. 5,644,716 in the name of AUTECHAUD et al., and entitled "INFORMATION PROCESSING SYSTEM WITH SHARED MEMORY", which application is filed concurrently herewith and claims priority from French Application No. 93 08710. Said application is assigned to the assignee of the subject application. This application is also related to U.S. application Ser. No. 08/275,383, now U.S. Pat. No. 5,568,633 in the name of LESMANNE et al., and entitled "PROCESS FOR COHERENT MANAGEMENT OF EXCHANGES BETWEEN LEVELS OF A HIERARCHY OF MEMORIES WITH AT LEAST THREE LEVELS", which application is filed concurrently herewith and claims priority from French Application No. 93 08711. Said application is assigned to the assignee of the subject application. The subject matter of the foregoing U.S. applications is incorporated herein by reference.

FIELD OF THE INVENTION

The present invention relates to a processor node.

BACKGROUND OF THE INVENTION

It is known that information processing systems with shared memory generally include a large number of processors, which are grouped in nodes associated with one another by links, in a variable number of nodes up to the maximum configuration. Each node includes a series of processors and one or more local memories, which are parts of a general memory. In a conventional configuration, the processors and the local memory or memories are all connected directly to a common linking bus of the parallel link type. This solution has the advantage of very direct access for each processor to each local memory, but it has the disadvantage of making all the interrogation and information transfer messages travel over the same linking bus, in such a way that the maximum rate of messages on the linking bus is very rapidly reached, and a problem of access to the linking bus then arises, since the messages that cannot be transmitted are made to wait until the linking bus is available. Moreover, when the number of processes is increased, the number of messages is also increased very greatly, on the one hand because of the interrogation and information transfer messages that are made necessary by the existence of the two processors, but also because of additional coherence messages that are required when a plurality of processors work on the same information and must modify the information while the information is simultaneously requested by other processors.

Conventionally, an attempt has been made to handle the increase in the message rate by improving the performance of the memory blocks, in particular increasing their access speed, and by improving the performance of the buses, that is, increasing the message transmission rate on the buses. Such improvements can generally be obtained only by using expensive technologies, which greatly increase the cost of the information processing system.

One object of the invention is to propose a processor node with an original structure that improves the message rates regardless of the technology used to make the memory blocks or linking buses.

According to the invention, a processor node is proposed, including at least one local bus that assures a parallel link between the processors, a local memory and a shared cache, and one network bus that assures a parallel link between the local memory, the shared cache, and one input/output device.

Thus the local bus is used only for transmitting messages that are directly useful to the processors, while the network bus is used for transmission of messages of links with the other nodes, in such a way that the number of messages circulating on each bus is minimized. While minimizing the message rate, it will be noted that this arrangement nevertheless enables simultaneous access to the local memory and to the shared cache, either by the local bus or by the network bus.

SUMMARY OF THE INVENTION

In an advantageous version of the invention, it includes at least one serial link controller connected to the network bus and assuring a relation with an adjacent node or an input/output device. Thus in transmitting messages to inside the node, benefit is gained from the low latency of the parallel bus, in order to have rapid access to the local information, as well as from the increased rate of the serial links, for updating information stored in the local memory and in the shared cache and introducing into the shared cache new copies of information retaining in the local memory of a different node, so that later, benefit is again gained from the low latency of the parallel link internal to the node.

In an advantageous aspect of the invention, the node includes two local buses, each associated with the processors, one shared cache and one local memory, and two network buses, likewise each associated with one shared cache and one local memory. Thus without increasing the number of outlets necessary in each bus, the total message capacity that can be transmitted between the processors on the one hand and the shared cache and local memory on the other is increased.

BRIEF DESCRIPTION OF THE DRAWINGS

Further characteristics and advantages of the invention will become more apparent from the ensuing description of a particular non-limiting embodiment of the system according to the invention, in conjunction with the drawings, in which.

DETAILED DESCRIPTION OF THE DRAWINGS AND THE PREFERRED EMBODIMENTS

Figure 1:
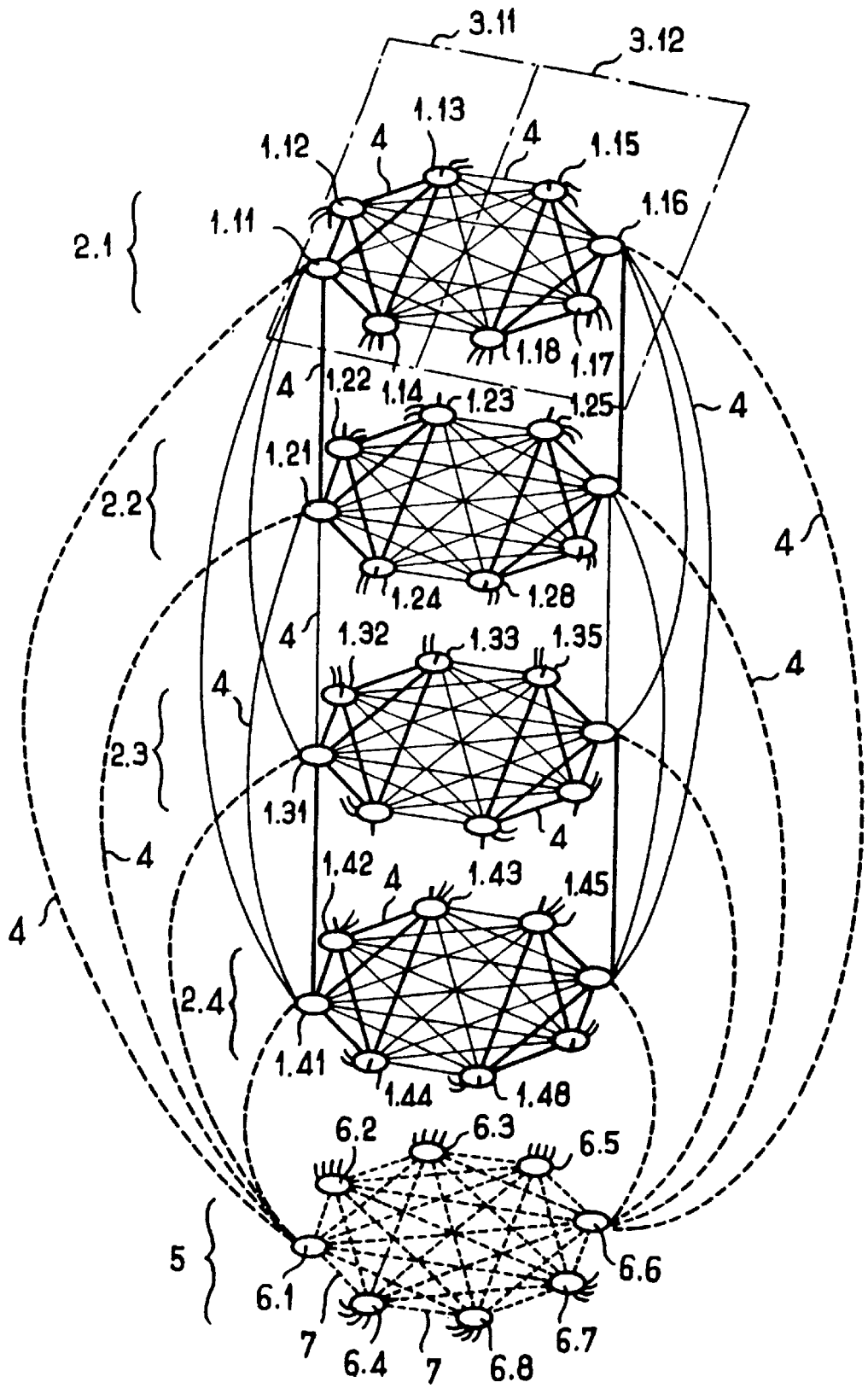
FIG. 1 is a schematic diagram illustrating the general structure of the information processing system according to the invention.
Figure 2:
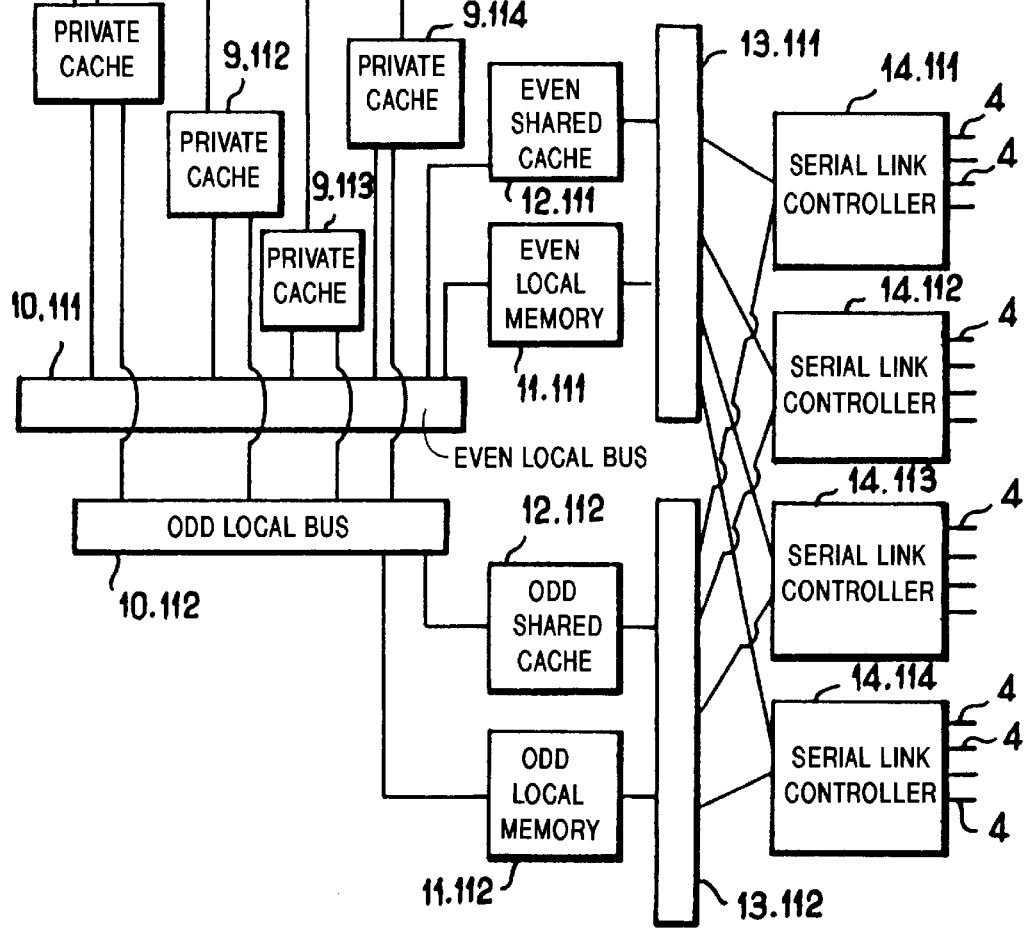
FIG. 2 is a schematic diagram illustrating the structure of a node in an embodiment of the invention.

Turning to FIG. 1, the information processing system according to the invention is a shared memory system, that is, a system in which the general memory to which all the processors must be capable of having access is distributed among local memories, to which each of the processors may have direct or indirect access, the processors themselves being grouped in nodes associated with one another by links. In FIG. 2, the processor nodes are identified by the general reference numeral 1, and in an aspect of the invention the set of nodes 1 is divided among supernodes having the general reference number 2. The set shown includes four supernodes 2 each including eight nodes 1. To enable particular identification of the nodes and supernodes, the general reference numeral is associated with a particular reference numeral. Accordingly, the first supernode has the complete reference numeral 2.1; the second supernode has the complete reference numeral 2.2; the third supernode has the complete reference numeral 2.3; and the fourth supernode has the complete reference numeral 2.4. In each supernode 2, each node 1 has a particular reference numeral identifying it on the one hand in terms of the supernode to which it belongs (the first digit in the particular reference numeral), and on the other by its ordinal number in the supernode (the second digit of the particular reference numeral). Hence the first node of the first supernode has the complete reference numeral 1.11; the second node of the first supernode has the complete reference numeral 1.12; and the third node of the first supernode has the complete reference numeral 1.13, and so forth. The first node of the second supernode 2.2 has the complete reference numeral 1.21; the second node of the second supernode 2.2 has the complete reference numeral 1.22, and so forth.

Each supernode 2 is divided into two subsets, physically indicated by a dot-dash line for the supernode 2.1. In FIG. 1, the first subset of the supernode 2.1, which includes the nodes 1.11, 1.12, 1.13 and 1.14, carries the complete reference numeral 3.11, and the second subset, which includes the nodes 1.15, 1.16, 1.17 and 1.18, carries the complete reference numeral 3.12. The nodes are connected to one another by serial links 4 represented by a heavy solid line, for a double serial link, and a fine solid line for a single serial link. It will be noted that a single serial link in the sense of the present description is conventionally made up of two differential sheathed pairs forming a single logic link and represented for these purposes by a single line in the drawings.

In the invention, the nodes of a subset 3 are connected to one another by double serial links and are connected to the nodes of an adjacent subset of the same supernode 2 by single serial links. Thus the node 1.11 is connected by double serial links to each of the nodes 1.12, 1.13 and 1.14 of the same subset 3.11, and by single links to the nodes 1.15, 1.16, 1.17 and 1.18 of the adjacent subset 3.12 of the same supernode 2.1.

In the preferred embodiment shown, the supernodes 2 are connected in pairs by double serial links associating each node of one supernode with a corresponding node of another supernode. Hence the two supernodes 2.1 and 2.2 are paired, by making a double link between the node 1.11 and the node 1.21, between the node 1.12 and the node 1.22, and so forth. These double links are not indicated in the drawing except for the nodes on the far sides of the schematic representation shown; for the other nodes, they are marked merely by the beginning of a heavy line. In the same way, the supernodes 2.3 and 2.4 are paired by double links that respectively connect the node 1.31 to the node 1.41, the node 1.32 to the node 1.42, and so forth.

In addition, each pair of associated supernodes is connected to another pair of associated supernodes by single serial links connecting each node of one pair to two corresponding nodes of the other pair. Hence the node 1.11 is connected by a single serial link to the node 1.31 and to the node 1.41, and so forth. The node 1.21 is also connected by a single serial link to the node 1.31 and to the node 1.41, and so forth. As above for the double links between two paired supernodes, the single links between two pairs of supernodes have been marked on the drawing only for the nodes at the far sides, with the other single links being marked solely by the beginning of a fine line starting at each node.

In the preferred embodiment shown, the information processing system according to the invention further includes one supernode 5 of input/output devices, carrying the general reference numeral 6, each input/output device 6 being connected by a serial link 4 to a corresponding node of each of the supernodes. Hence in FIG. 1, the input/output devices respectively carry the complete reference numerals 6.1, 6.2, etc. The input/output device 6.1 is connected by single serial links 4 to the nodes 1.11, 1.21, 1.31 and 1.41; the input/output device 6.2 is connected by single serial links 4 to the nodes 1.12, 1.22, 1.32 and 1.42, and so forth, and in the supernode 5, the input/output devices are also connected to one another by a single serial link 7. In the same way as above, the single serial links between the input/output devices have all been shown in the drawing, while the serial links with the processor nodes have been shown only for the nodes at the far sides. It will be noted that for the sake of greater clarity in the drawing, the input/output devices 6 have been grouped in the lower portion of the schematic diagram of FIG. 1, but in reality they will be generally distributed at various levels of the machine that includes the information processing system of the invention.

FIG. 2 schematically shows the structure of one embodiment of a node according to the invention. In this embodiment, each node includes four processors carrying the general reference numeral 8 and a particular reference numeral making it possible to identify it with respect to the node to which it belongs (the first two digits in the particular reference numeral), and by its ordinal number in the node (the last digit in the particular reference numeral). It will be assumed below that FIG. 2 illustrates the structure of the node 1.11, and to identify each of the processors in relation with this node, the processors carry the complete reference numerals 8.111, 8.112, 8.113 and 8.114. By analogy, it will be understood that for the node 1.43, for example, the complete reference numerals of the processors will be 8.431, 8.432, 8.433 and 8.434.

Each processor is associated with a private cache carrying the general reference numeral 9 and with the respective complete reference numerals 9.111, 9.112, 9.113 and 9.114. The term "cache" is known to be conventionally used to designate a memory that contains information which is a copy of information retained in its original form at an address in the general memory of the information processing system, so that a particular instruction processor will be capable of using this information faster than if it had to systematically interrogate the general memory each time it executes an instruction implementing that information. In the sense of the present description, the term "private cache" will be used for a cache to which an instruction processor is connected directly. Each of the private caches 9 is connected to two local buses carrying the general reference numeral 10 and the complete reference numerals 10.111 and 10.112, respectively.

In the sense of the present description, the term "local memory" is used for a memory including a portion of the general memory, that is, a portion of the original information accessible by all the microprocessors. The term "shared cache" is used to designate a memory that contains a copy of information contained in the local memories of other nodes of the information processing system and that is intended to be used by the various processors of the node in which the shared cache is disposed. Conventionally, the private caches, shared caches and local memories include management processors, not shown in the drawing.

When a piece of information necessary for one of the processors is unavailable in the private cache to which the processor is connected, interrogation is done at the level of the local memory of the node, if in conventional fashion it contains that information in its original form, or at the level of the shared cache if that information is conventionally retained in its original form by the local memory of a different node. If information retained conventionally by the local memory of another node is unavailable at the level of the shared cache, the management processor of this shared cache interrogates the local memory of the node that conventionally retains this information in its original form. The private caches, shared caches and local memories may accordingly be considered to be a hierarchy of memories. Each private cache is a memory with a higher level in the hierarchy for a particular node; each shared cache is a second level memory in the hierarchy for the node in question; and each local memory is accordingly a second level memory in the hierarchy for the node in question and a third level memory in the hierarchy for the other nodes.

In the embodiment of FIG. 2, the portion of general memory associated with the node has been subdivided into two local memories: the even local memory 11.111, which contains the information at the even addresses and is associated with the even local bus 10.111, and the odd local memory 11.112, which contains the information retained at the odd addresses and is connected to the odd local bus 10.112. In the same way, the shared cache associated with the node has been divided into an even shared cache 12.111, containing copies of information at even addresses and connected to the even local bus 10.111, and the odd shared cache 12.112 containing copies of information at the odd addresses and connected to the odd local bus 10.112. Each local memory and each shared cache is connected to a network bus 13 assuring a parallel connection, respectively 13.111 for the even network bus and 13.112 for the odd network bus.

The network buses are connected to serial link controllers 14 with the complete reference numerals 14.111, 14.112, 14.113 and 14.114, respectively, in the embodiment shown. The serial link controllers 14 assure an interface between the network buses and the serial links 4 that assure the links between the nodes. To that end, the serial link controllers 14 are connected to each of the network buses 13. In the embodiment shown, each node is associated with other nodes, and with the input/output devices, by a total of 15 serial links. The network buses could be connected to serial links by an interface including only a single serial link controller. However, for technological reasons, the power consumed would be too great and would cause unacceptable heating of this interface. This is why the interface between the network buses and the serial links has been subdivided into four serial link controllers. The number of serial link controllers used, it is understood, depends on the number of serial links that must be connected to one node, but also on the number of sockets that it is acceptable to dispose on the network buses to assure the linkage between these network buses and the serial link controllers. In the embodiment shown, it will be noted that each parallel-type bus, whether a local bus or a network bus, is equipped with six outlets, which makes it possible to assure a sufficiently high message rate without unduly increasing the complexity of the transmission protocols for these messages.

Figure 4:
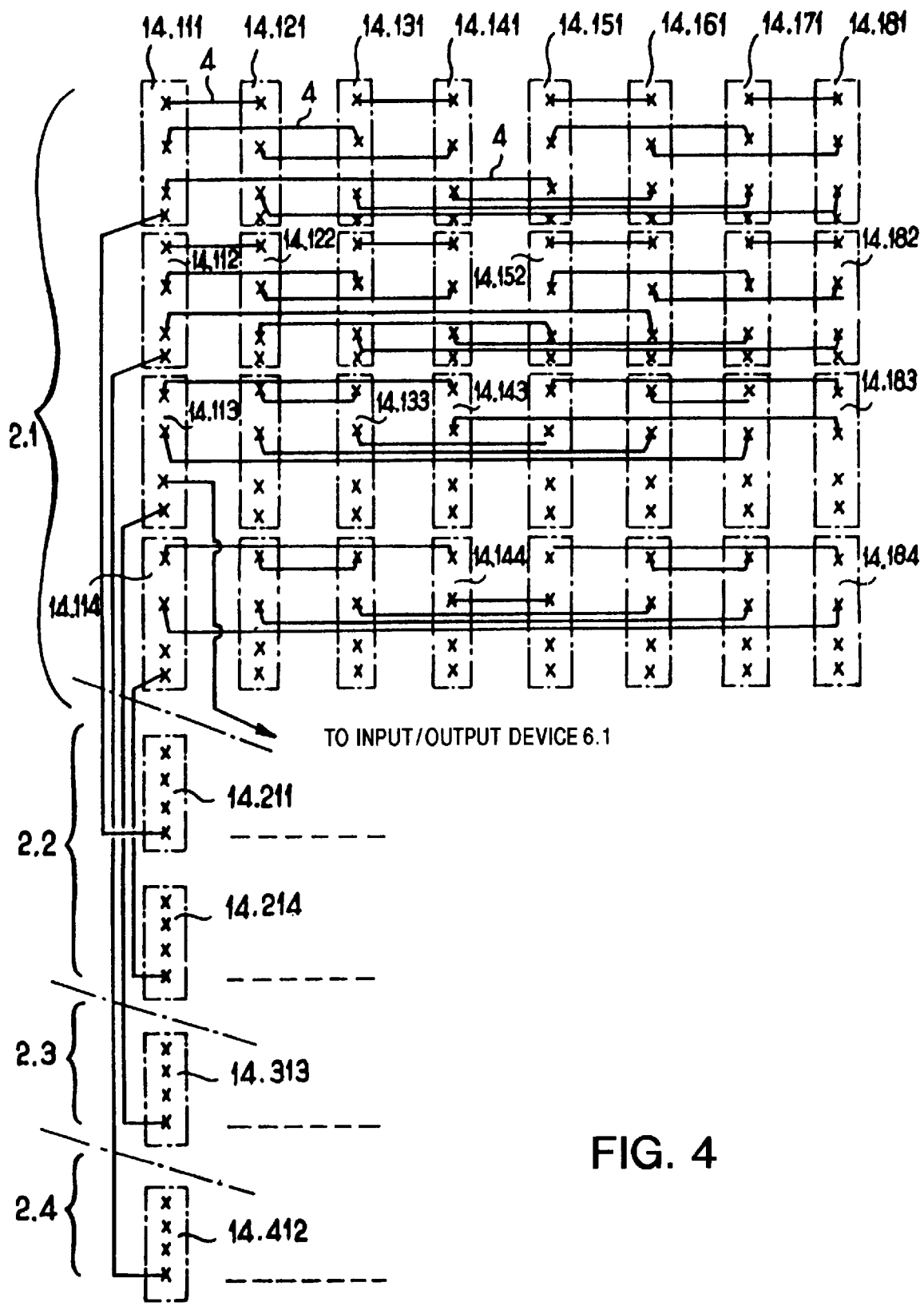
FIG. 4 is a fragmentary schematic illustration of the connections among the serial links in a supernode and with one node of other supernodes of the system.

FIG. 4 shows the distribution of the serial links among the serial link controllers of the same supernode and with the serial link controllers of the other supernodes with which a supernode is associated. The lines between the serial link controllers and the network buses have not been shown. To simplify the drawing, in FIG. 4 only the distribution of serial links between the serial link controllers of the first supernode 2.1 has been shown, and for the links with the other supernodes, only the distribution of the serial links between the node 1.11 and the corresponding serial link controllers of the other supernodes has been shown.

In this drawing figure, each serial link controller is represented by a rectangle drawn in dot-dashed lines, and the connections of a serial link 4 with a serial link controller are represented by a solid line for each single serial link. With reference to the numbering system adopted above, the first serial link controller of the node 1.11 has the complete reference numeral 14.111, while the first serial link controller of the node 1.12 has the complete reference number 14.121, and so forth. The second serial link controller of node 1.11 has the complete reference numeral 14.112, the second serial link controller of node 1.12 has the complete reference numeral 1.122, and so forth.

By way of example, the double serial link connecting the node 1.11 to the node 1.12 is shown as one single serial link connecting the serial link controller 14.111 and the serial link controller 14.121 and one single serial link connecting the serial link controller 14.112 and the serial link controller 14.122; the double serial link connecting the node 1.11 to the node 1.14 is shown as one single link connecting the serial link controller 14.113 to the serial link controller 14.143 and one single serial link connecting the serial link controller 14.114 to the serial link controller 14.144; the double serial link connecting the node 1.11 to the node 1.21 is shown as one single serial link connecting the serial link controller 14.111 and the serial link controller 14.211 and one single serial link connecting the serial link controller 14.114 and the serial link controller 14.214; the single serial link connecting the node 1.11 to the node 1.31 is represented by the single serial link connecting the serial link controller 14.113 to the serial link controller 14.313, and the single serial link connecting the node 1.11 to the node 1.41 is shown as the single serial link connecting the serial link controller 14.112 to the serial link controller 14.412.

The serial link controller 14.113 further includes a terminal connected to the serial link controller of the input device 6.1; this terminal has not been shown in the drawing. The serial link controller 14.114 includes an unassigned terminal, which as applicable can be used to assure a double serial link between the node 1.11 and the input/output device 6.1.

It will be noted that the links thus made make it possible to proceed from any one node to any other node by using only two serial links. By way of example, one proceeds from the node 1.1 to the node 1.33 by using first one of the serial links from node 1.11 to node 1.13 and then the serial link connecting node 1.13 to node 1.33. In the same way, one proceeds from node 1.35 to node 1.22 by using the serial link from node 1.35 to node 1.32 and then the serial link from node 1.32 to node 1.22. Taking into account the meshing of the supernode 5 with input/output devices, this property is also obtained for the link of any of the input/output devices with any of the nodes. It will be noted on this point that an input/output device is not conventionally intended to function with all the nodes, and one can accordingly economize on links by omitting those connecting the input/output devices to one another.

It will be noted in this respect that to simplify the message routing protocols, it is preferable to systematically use the same type of combination of routes, for instance a serial link inside a supernode with a serial link between supernodes. In this respect, it will also be noted that when two serial links that must be used successively are not connected to the same serial link controller, the message transmitted travels over the network bus of the intermediate node. In the first example given above, a message will then pass successively, in the serial link connecting the serial link controllers 14.111 and 14.131, over the network bus of the node 1.13 in order to go from the serial link controller 14.131 to the serial link controller 14.133 and then from the serial link controller 14.133 to the serial link controller 14.333 of the node 1.33.

Figure 3:
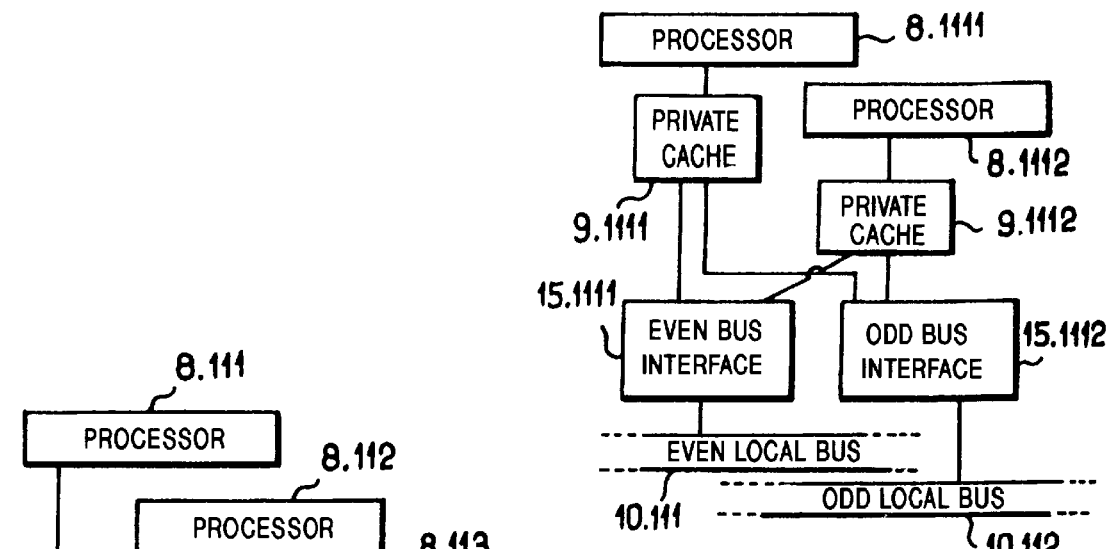
FIG. 3 illustrates a variant embodiment of the structure of the node of FIG. 2.

FIG. 3 in fragmentary fashion shows a variant embodiment of the node shown in FIG. 2 that makes it possible to multiply by two the number of processors of the node, without increasing the number of outlets on the local buses and without moreover changing the links between the nodes. In this variant embodiment, each of the processors and the private cache associated with each processor is replaced by two processors, each associated with one private cache. FIG. 3 illustrates the doubling of the processor 8.111 of FIG. 2; it is understood that an identical doubling is done for the other processors of the same node so as not to complicate message management with the node unduly. The processor 8.111 is then replaced by one processor 8.1111 and one processor 8.1112, respectively connected to a private cache 9.1111 and a private cache 9.1112. Each private cache is connected to two interfaces 15 for the linkage with the local buses: one even bus interface 15.1111, which is connected to the even local bus 10.111, and one odd bus interface 15.1112, which is connected to the odd local bus 10.112.

Figure 5:
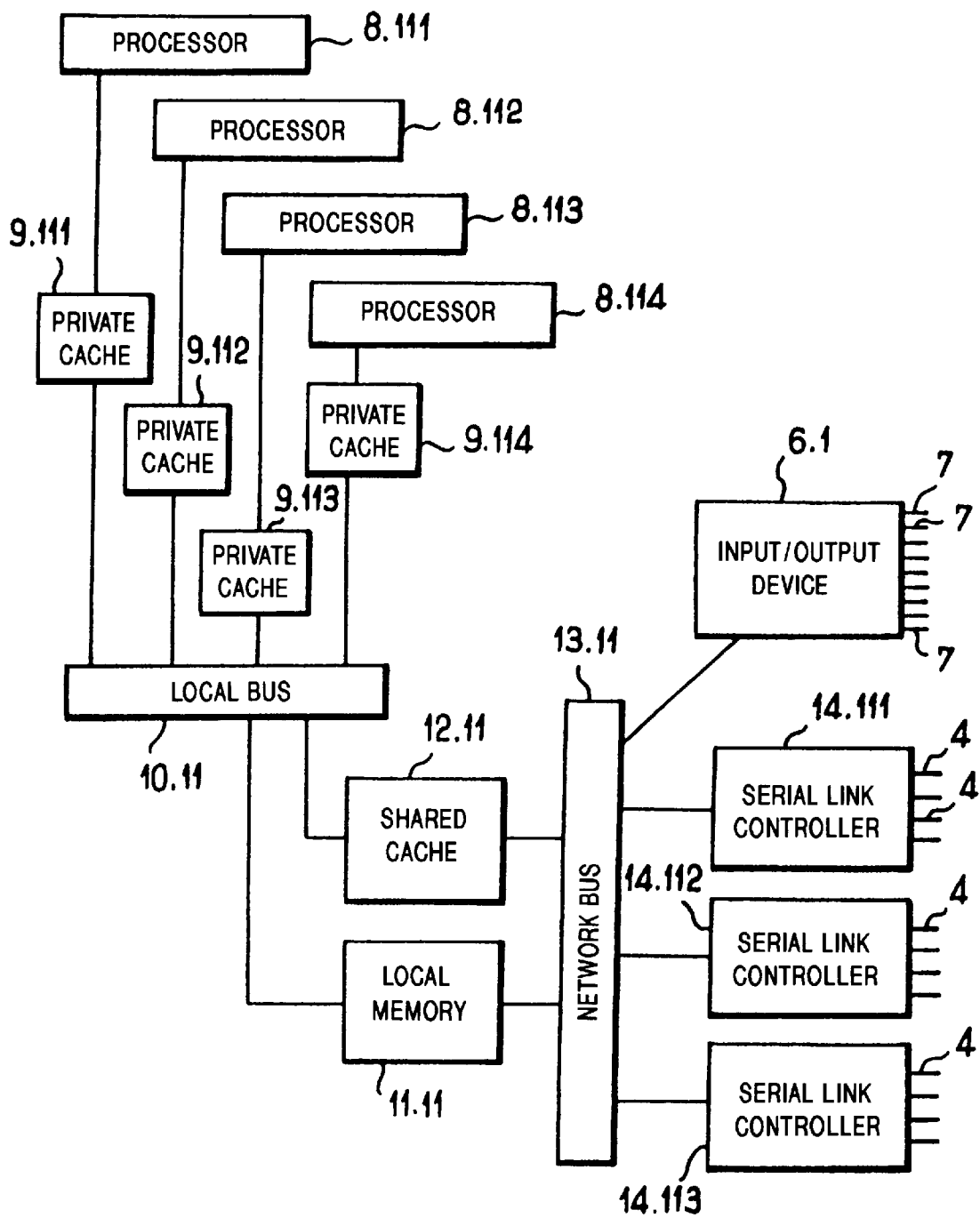
FIG. 5 schematically shows an exemplary structure of a node in the case of a configuration less than the maximum configuration.

In connection with FIG. 2, it will be noted that doubling of the local buses and network buses into two buses, one associated with the even addresses and the other associated with the odd addresses, makes it possible to lessen the latency of relations with the local memory and the shared cache, without increasing the number of outlets at the level of each parallel-type bus. When the power of the processors installed in each node, or the degree of sharing of information among the nodes, does not justify such a sophisticated system, then the system according to the invention may be achieved by providing a single local bus and a single network bus in each node, these buses being associated with a single local memory and a single shared cache, as shown in FIG. 5. In that embodiment, the node as before includes four processors 8.111, 8.112, 8.113 and 8.114, connected respectively to the private caches 9.111, 9.112, 9.113 and 9.114, which are associated with a single local bus 10.11, which in turn is connected to a single local memory 11.11 and a single shared cache 12.11. The local memory and the shared cache are connected to a single network bus 13.11. It will be noted that in this configuration, the local bus as before serves only to transmit messages necessary for the processors of the node in order to sample the information contained in the local memory or the copies of information contained in the shared cache, while the network bus serves to transmit messages intended for updating information of the local memory or the shared cache, or for putting into the shared cache the copies, requested by this shared cache, of information contained in the local memories of other nodes, or sampling, in the local memory of the node, information requested by the shared caches of other nodes.

It will also be noted that the embodiment shown in FIG. 5 corresponds to a configuration less than the maximal configuration, that is, a configuration including a number of nodes less than the number of nodes shown in FIG. 1, so that the number of serial links has been made twelve, and the number of serial link controllers has been made three. Under these conditions, the number of network bus outlets used by the local memory, the shared cache and the serial link controllers is only 5, so that it is then possible to connect the input/output device 6.1 directly to the local bus 13.11. In that case, the serial link controller of the input/output device 6.1 (not shown in this drawing figure) serves solely to assure management of the messages over the serial links 7 connecting the input/output devices to one another.

Figure 6:
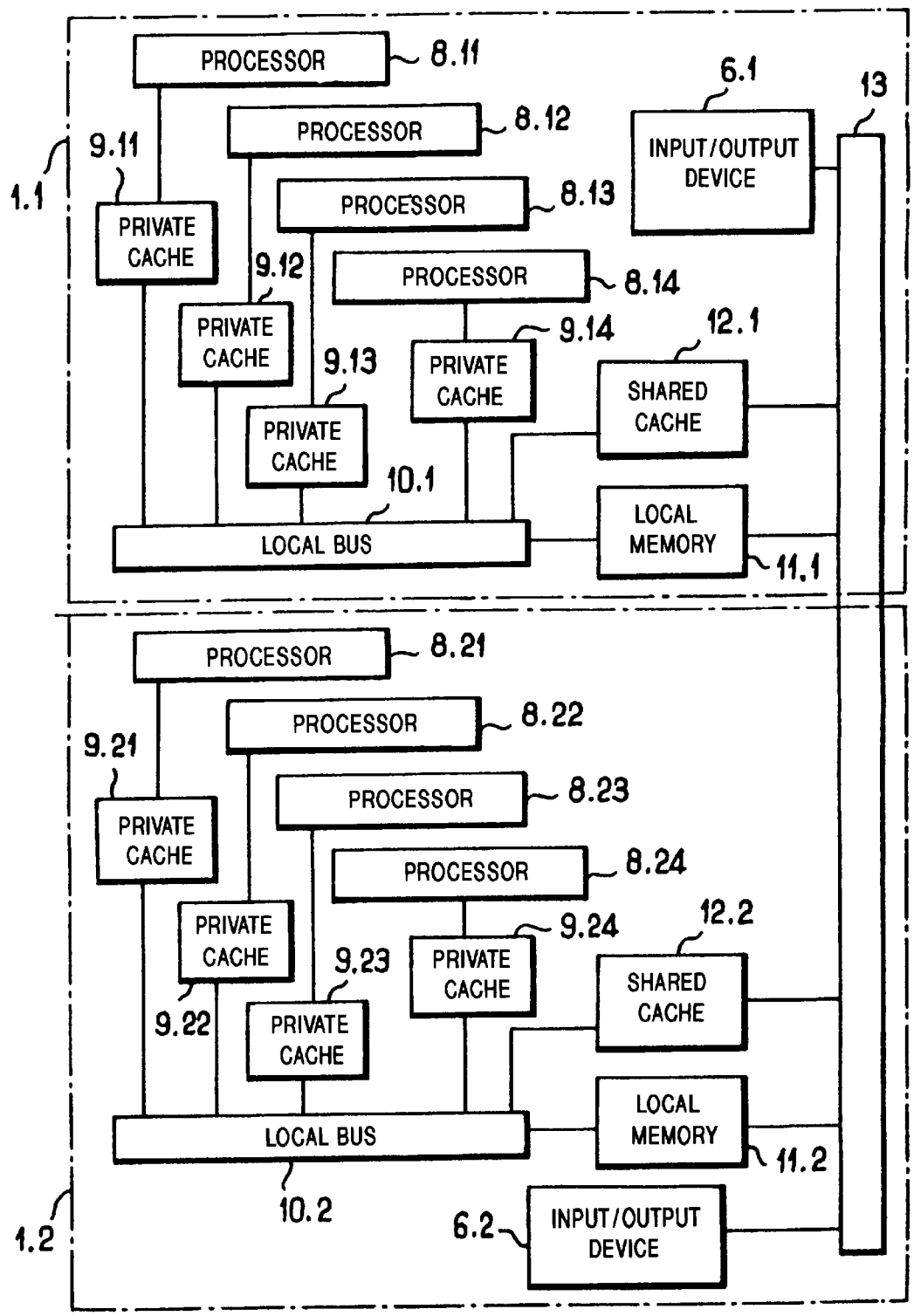
FIG. 6 schematically shows the structure of the information processing system in the case of a configuration including only two nodes.

FIG. 6 illustrates an even simpler configuration, including only two nodes 1.1 and 1.2, physically represented by boxes in dot-dashes lines in this drawing figure. As before, each node includes four processors, with respective reference numerals 8.11, 8.12, 8.13 and 8.14 for the node 1.1; and 8.21, 8.22, 8.23 and 8.24 for the node 1.2. The processors are connected respectively to the private caches 9.12, 9.12 . . . and 9.21, 9.22, which in turn are connected to two local buses, 10.1 and 10.2, respectively. The local buses are each connected to one local memory, 11.1 and 11.12, respectively, and one shared cache 12.1 and 12.2, respectively. In this configuration, each node also includes an input/output device, 6.1 and 6.2, respectively. It can be seen that instead of providing one network bus in each node and serial links between the nodes, it is then more advantageous to provide one common network bus 13, which is equipped with six outlets, as in the preceding examples.

It is understood that the invention is not limited to the embodiments described, and variant embodiments may be made without departing from the scope of the invention as defined by the claims.

In particular, although the invention has been described in terms of an information processing system including a plurality of nodes that are connected either by way of serial links as described in conjunction with FIGS. 2 and 5 or by a common network bus as described in conjunction with FIG. 6, the invention also has value even when the information processing system includes only a single processor node. In fact, in that case, the local memory, which becomes the sole memory of the information processing system, is processed by the shared cache as if it were the local memory of a different node, in such a way that frequently used information is copied into the shared cache, traveling over the network bus, and is then available both inside the memory and in the shared cache in such a way that the rate of memory interrogation messages from the processors is very substantially reduced. In the case where the shared cache has higher performance access technology than the memory, then one may also provide that a major portion of the interrogation messages will then be processed by the shared cache, despite the fact that this information is also contained in the memory.

The structure of nodes according to the invention accordingly enables optimization of message rates over the various links, regardless of the configuration one seeks to achieve. In particular, for a configuration ranging up to four processors, a single node whose structure is in accordance with the invention will be used; for an open-ended configuration of from 1 to 8 processors, the structure described in conjunction with FIG. 6 will preferably be used; for an information processing system with an open-ended configuration including from 4 to 32 processors, a structure reproducing the structure of a supernode according to the invention will preferably be realized; for an open-ended configuration including from 8 to 64 processors, a structure including two supernodes will preferably be realized; and for a configuration including from 16 to 128 processors, these processors will preferably be distributed among four supernodes.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

We claim:

1. A processor node comprising a plurality of processors, a first shared cache having first and second terminal means, first main memory means having first and second terminal means and data shared by said plurality of processors of said processor node, inter-nodal communication means for connecting the processor node to at least another node through at least one link other than a bus, a first bus connected to said processors and said first terminal means of said first shared cache and said first main memory means, said first bus being used for data directly useful to said processors, and a second bus connected to said inter-nodal communication means and said second terminal means of said first shared cache and said first main memory means, said second bus being used for data communication between said first shared cache and said first main memory means of said node and between said first shared cache of the processor node and said at least another node through said inter-nodal communication means of the node.

2. The processor node of claim 1, wherein said internodal communication means comprises serial link controller means.

3. The processor node of claim 1, further comprising a second shared cache having first and second terminal means, second main memory means having first and second terminal means and data shared by said plurality of processors, a third bus connected to said processors and to said first terminal means of said second shared cache and said second main memory means, said third bus being used for data directly useful to said processors, and a fourth bus connected to said internodal communication means and said second terminal means of said second shared cache and said second main memory means, said fourth bus being used for data communication between said second shared cache and said second main memory means of said processor node and between said second shared cache of the processor node and said at least another node through said internodal communication means of the processor node.

4. The processor node of claim 3, wherein said first and second main memory means have respective data at first and second addresses of different parities, said first and second shared caches have copies of respective ones of said respective data at first and second addresses and said first and third buses are used for said respective data at first and second addresses.

5. The processor node of claim 3, wherein said internodal communication means comprises serial link controller means.

6. The processor node of claim 3, further comprising input/output means connected to said second and fourth bus for data communication external to the processor node and said at least another node.

7. The processor node of claim 3 wherein a processor is replaced by two processors each of said two processors being connected to two interfaces to provide linkage with the first and the third bus.

8. The processor node of claim 7, wherein said first and second main memory means have respective data at first and second addresses of different parities, said first and second shared caches have copies of respective ones of said respective data at first and second addresses and said first and third buses are used for said respective data at first and second addresses.

9. The processor node of claim 7, wherein said inter-nodal communication means comprises serial link controller means.

10. The processor node of claim 1, further comprising input/output means connected to said second and fourth bus for data communication external to the processor node and said at least another node.

11. The processor of claim 1 wherein said at least one link is a serial link.

12. The processor of claim 1 wherein said second bus is used for transmission of data with at least another node.

13. The processor of claim 1 wherein said first bus is used to transmit messages necessary to said plurality of processors.

14. An information processing system comprising a plurality of nodes, at least one of said nodes having a plurality of processors, a first shared cache having first and second terminal first main memory means having first and second terminal means, inter-nodal communication means for a connection of said node to at least another node through at least one link other than a bus, a first bus connected to said processors and said first terminal means of said first shared cache and said first main memory means, said first bus being used for data directly useful to said processors, and a second bus connected to inter-nodal communication means and to said second terminal means of said first shared cache and said first main memory means, said second bus being used for data communication between said first shared cache and said first main memory means of said one of said nodes and between said first shared cache of said one of said nodes and said at least another node through said inter-nodal communication means of the node.

15. The system of claim 14, further comprising a second shared cache having first and second terminal means, second main memory means having first and second terminal means and data for said plurality of processors, a third bus connected to said plurality of processors and to said first terminal means of said second shared cache and said second main memory means, said third bus being used for data directly useful to said processors and a fourth bus connected to said inter-nodal communication means and to said second terminal means of said second shared cache and said second main memory means for data communication there-between, said second bus being used for data communication between said first shared cache and said first main memory means of said node and between said first shared cache of the node and said at least another node through said inter-nodal communication means of the node.

16. The system of claim 15, wherein a processor is replaced by two processors, each of these two processors being connected to two interfaces for providing linkage with the first and the third bus.

17. The system of claim 15, wherein said first and second main memory means have respective data at first and second addresses of different parities, said first and second caches have copies of respective ones of said respective data at first and second addresses and said first and third bus are used for said respective data at first and second addresses.

18. The system of claim 15, wherein said at least one link is a serial link and said internodal communication means comprises serial link controller means.

19. The system of claim 15, further comprising input/output means connected to said second and fourth bus for communication external to the system.

20. The processor node of claim 19 further comprising second input/output means connected to said first input/output means.

21. The processor node of claim 20, wherein said first and second input/output means are connected there-between through at least a serial link.

22. The system of claim 14, wherein said at least one link is a serial link and said internodal communication means comprises serial link controller means.

23. The system of claim 14, further comprising input/output means connected to said second bus for communication external to the system.

24. The processor node of claim 23 further comprising second input/output means connected to said first input/output means.

25. The processor node of claim 24, wherein said first and second input/output means are connected there-between through at least a serial link.

\* \* \* \* \*